United States Patent [19]

Sugano et al.

[11] Patent Number: 5,475,619

[45] Date of Patent: Dec. 12, 1995

[54] METHOD OF AND APPARATUS FOR PROCESSING VACUUM PRESSURE INFORMATION

[75] Inventors: Shigeru Sugano; Mitsuhiro Saito; Shigekazu Nagai; Yoshiharu Ito; Takashi Takebayashi, all of Ibaraki, Japan

[73] Assignee: SMC Kabushiki Kaisha, Tokyo, Japan

[21] Appl. No.: 393,035

[22] Filed: Feb. 23, 1995

Related U.S. Application Data

[63] Continuation of Ser. No. 254,659, Jun. 13, 1994, abandoned, which is a continuation of Ser. No. 838,948, Feb. 21, 1992, abandoned.

[30] Foreign Application Priority Data

Feb. 22, 1991 [JP] Japan ..................................... 3-028919
Feb. 22, 1991 [JP] Japan ..................................... 3-028956

[51] Int. Cl.⁶ .............................. G01L 9/00; G01M 3/02
[52] U.S. Cl. .................... 364/558; 73/4 V; 73/37; 340/626; 414/737; 901/40
[58] Field of Search ..................................... 364/558, 550, 364/551.01, 510; 73/1 R, 4 R, 4, 37; 340/626; 901/40; 414/730, 737; 209/537

[56] References Cited

U.S. PATENT DOCUMENTS

| | | | |
|---|---|---|---|
| 4,266,905 | 5/1981 | Birk et al. | 901/40 |
| 4,378,523 | 3/1983 | Norman | 73/4 V X |
| 4,430,886 | 2/1984 | Rood | 73/37 |
| 4,459,843 | 7/1984 | Durham | 73/37 |
| 4,635,988 | 1/1987 | Potters et al. | 414/737 |
| 4,815,313 | 3/1989 | Beard | 73/4 V X |
| 5,060,174 | 10/1991 | Gross | 364/558 |
| 5,117,675 | 6/1992 | Notoyama et al. | 73/37 |

FOREIGN PATENT DOCUMENTS

| | | |
|---|---|---|
| 392158 | 2/1991 | Austria . |
| 0269128 | 6/1988 | European Pat. Off. . |
| 0399069 | 11/1990 | European Pat. Off. . |
| 3913584 | 10/1990 | Germany . |
| 4026574 | 2/1991 | Germany . |
| 2069144 | 8/1981 | United Kingdom . |
| 2184850 | 7/1987 | United Kingdom . |

OTHER PUBLICATIONS

MKS INSTRUMENTS, Bulletin 250B, 2 pages, Jul. 1982, "Single Gas Controller for Pressure or Flow Control".

Primary Examiner—Ellis B. Ramirez
Assistant Examiner—Eric W. Stamber
Attorney, Agent, or Firm—Oblon, Spivak, McClelland, Maier & Neustadt

[57] ABSTRACT

A method and an apparatus for electrically processing vacuum pressure information in a vacuum unit. The apparatus basically comprises a vacuum supply mechanism, a detecting device, a determining device, a failure precognition signal generating device and a pressure setting-up device. In the apparatus, pressure values are first detected, and a desired pressure value lower than the maximum pressure value of the detected pressure values is digitally displayed on a display unit. Then, the desired pressure value is stored in a storage unit, and pressure values relative to vacuum, which are detected from the detecting device held in front of a passage which communicates with a vacuum port, are converted into digital signals. Thereafter, the digital signals thus converted are digitally displayed on the display unit. Further, the desired pressure value stored in the storage unit is compared with each of the detected pressure values. When they coincide with each other within a predetermined range, a predetermined signal is generated.

9 Claims, 8 Drawing Sheets

METHOD OF AND APPARATUS FOR PROCESSING VACUUM PRESSURE INFORMATION

This application is a continuation of application Ser. No. 08/254,659, filed on Jun. 3, 1994, now abandoned, which is a continuation of application Ser. No. 07/838,948, filed Feb. 21, 1992, abandoned.

BACKGROUND OF THE INVENTION

1. Field of the Invention

The present invention relates to a method and an apparatus for electrically processing vacuum pressure information.

2. Description of the Related Art

Heretofore, pressure switches for either negative pressure or positive pressure have widely been employed in a pneumatic apparatus or the like.

A description will now be made of one example illustrative of a pressure switch for the negative pressure, which is actuated to convert a pressure value into a pressure signal/electric signal. Such a pressure switch is employed in a negative pressure (vacuum) system including pressurized air, a fluid passage or path and a pneumatic apparatus. That is, the pressure switch is used to confirm whether a subject or object (work) to be fed has been attracted by or released from a suction cup or pad.

Figure 1:
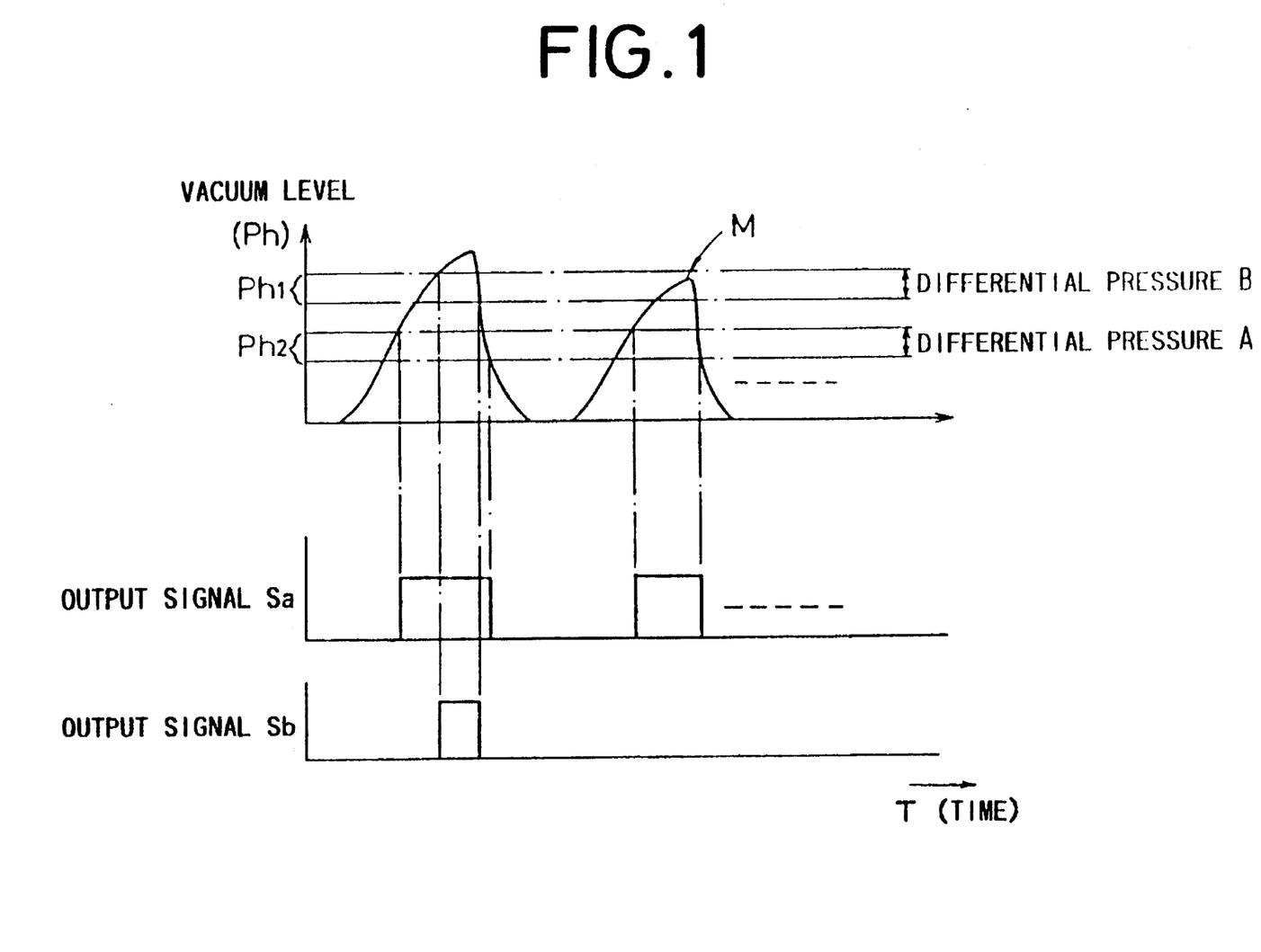
FIG. 1 is a view for describing the manner in which a pressure switch employed in a conventional vacuum control apparatus is actuated.

FIG. 1 is an exemplary view for describing the manner in which this type of pressure switch has been actuated. A detecting circuit comprising a pressure switch having a carrier diffusion type semiconductor pressure sensor therein, an amplifier, an output circuit and a variable resistor or the like, generates output signals Sa, Sb corresponding to differential pressures A and B relative to preset pressure values at the time of the attraction of the work by the suction pad and the release (vacuum break) of the work from the suction pad. Incidentally, the differential pressures A and B have been set up to avoid undesired chattering action.

The output signal Sb is produced based on a threshold value $P_{h1}$ of a relatively high vacuum level. In addition, the output signal Sa is of a signal based on a threshold value $P_{h2}$ of a vacuum level lower than $P_{h1}$. The output signals Sa, Sb are supplied to a sequence controller operable with a computer for Factory Automation or the like so as to activate various control driving means or the like.

In the above prior art, however, a vacuum displaying means is not normally disposed. Therefore, the attraction of the work by the suction pad and the release of the work from the suction pad are repeated to determine the threshold values $P_{h1}$, $P_{h2}$. In order to produce the output signals Sa, Sb corresponding to the threshold values $P_{h1}$, $P_{h2}$, respectively, a variable resistor or the like is used to set up and adjust corresponding pressure. Thus, when a number of pressure switches are disposed in the pneumatic apparatus or the like, there is produced an error between each of pressure values detected from the switches and a preset value, thus creating a difficulty in quantitatively setting up the pressure. Further, the pressure is set up and adjusted in analog form, thereby causing a problem in that it is difficult to accurately set up the pressure. The maximum achievable vacuum level produced by repeatedly attracting the work with the suction pad and releasing the same therefrom varies with the elapse of time. In addition, the number of times (attraction/non-attraction state M shown in FIG. 1) in which the work cannot be subjected to sufficient attraction vacuum level, greatly increases due to malfunctions or undesired changes such as clogging of a filter, deterioration in performance of a vacuum pump or an ejector, leakage of vacuum pressure from a pipe, a joint and a suction pad, difference in type among works, a change in the surface of a work, a change in placement position of a work, fatigue and abrasion of the suction pad, failures of a feed valve, a destruction or burst valve, a vacuum safety valve and a vacuum relief valve at the time of the attraction/non-attraction of the work, etc. It is therefore necessary to subject each of switch output signals (pulse waveform signals) to a latch signal process or the like when a comparison process is made between the output signals Sa in order to previously provide information about the replacement of parts such as a typical filter with new ones. In addition, an apparatus including a signal processing circuit for performing its latch signal process becomes large in size. Thus, pressure switches for the positive pressure also have various drawbacks due to inconvenience similar to those of the pressure switches for the negative pressure.

SUMMARY OF THE INVENTION

It is a general object of the present invention to provide a method of and an apparatus for electrically processing vacuum pressure information wherein a desired pressure value can relatively easily be set up.

It is a principal object of the present invention to provide a method of and an apparatus for electrically processing vacuum pressure information wherein at the time that the maximum pressure value generated from a vacuum generator is reduced with the elapse of time by repeatedly performing a work delivering process or the like and the maximum effective value thus reduced cannot reach a preset pressure value (a failure precognition determining pressure value), a failure precognition signal is produced when the maximum effective value coincides with the displayed value preset, thereby providing a valuable aid for an effective prejudgment and enabling the failure precognition determining pressure value and pressure values indicative of differential pressure or the like to be accurately and easily set up, and the present pressure value, the failure precognition determining pressure value and the pressure values indicative of the differential pressure or the like can reliably be displayed.

It is another object of the present invention to provide a method of electrically processing vacuum pressure information in a vacuum unit, the method executed by a vacuum control apparatus, comprising the steps of detecting pressure values, displaying a desired pressure value lower than the maximum pressure value of the detected pressure values on displaying means in digital form, storing the desired pressure value in storing means, converting each of pressure values relative to vacuum into a digital signal, the pressure values being detected from a pressure detecting element held in front of a passage which communicates with a vacuum port, and digitally displaying the digital signals on the displaying means, and comparing the desired pressure value stored in the storing means with each of the detected pressure values relative to the vacuum and producing a predetermined signal when they coincide with each other in a given range.

It is a further object of the present invention to provide a method of electrically processing vacuum pressure information in a vacuum unit, wherein the desired pressure value stored in the storing means is greater than a pressure value of the maximum vacuum, which is determined from the detected pressure values.

It is a still further object of the present invention to provide a method of electrically processing vacuum pressure information in a vacuum unit, wherein the desired pressure value stored in the storing means includes a first pressure value greater than a maximum pressure value of the maximum vacuum, which is determined from the detected pressure values and a second pressure value greater than the first pressure value, and a predetermined pressure width for avoiding chattering action is specified by the first and second pressure values.

It is a still further object of the present invention to provide a method of electrically processing vacuum pressure information in a vacuum unit, wherein when each of the detected pressure values relative to the vacuum is lower than the desired pressure value plural times in succession at the time that the desired pressure value stored in the storing means is compared with each of the detected pressure values relative to the vacuum, a failure precognition signal is produced as a predetermined signal.

It is a still further object of the present invention to provide an apparatus for electrically processing vacuum pressure information in a vacuum unit, the apparatus having a failure precognitive function, comprising a vacuum supply mechanism, detecting means for detecting vacuum pressure values, determining means for comparing each of the detected vacuum pressure values with a preset pressure value and determining that the result of its comparison is in an improper state when each of the detected vacuum pressure values is equal to a predetermined value thereby to produce a signal indicative of the improper state therefrom, failure precognition signal generating means for generating a failure precognition signal therefrom in response to the signal indicative of the improper state, and pressure setting-up means for setting up at least a pressure value used for the determination of the improper state and a pressure value used for the failure precognition.

It is a still further object of the present invention to provide an apparatus for electrically processing vacuum pressure information wherein the determining means counts the number of pressure values greater in vacuum than the preset pressure value, and includes means for generating a signal indicative of an improper state when the number of the pressure values thus counted has reached a predetermined value.

It is a still further object of the present invention to provide an apparatus for electrically processing vacuum pressure information, which further includes means for digitally displaying the vacuum pressure values detected by the detecting means.

It is a still further object of the present invention to provide an apparatus for electrically processing vacuum pressure information, which further includes displaying means for digitally displaying at least the pressure value used for the determination of the improper state and the pressure value used for the failure precognition.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

Figure 2:
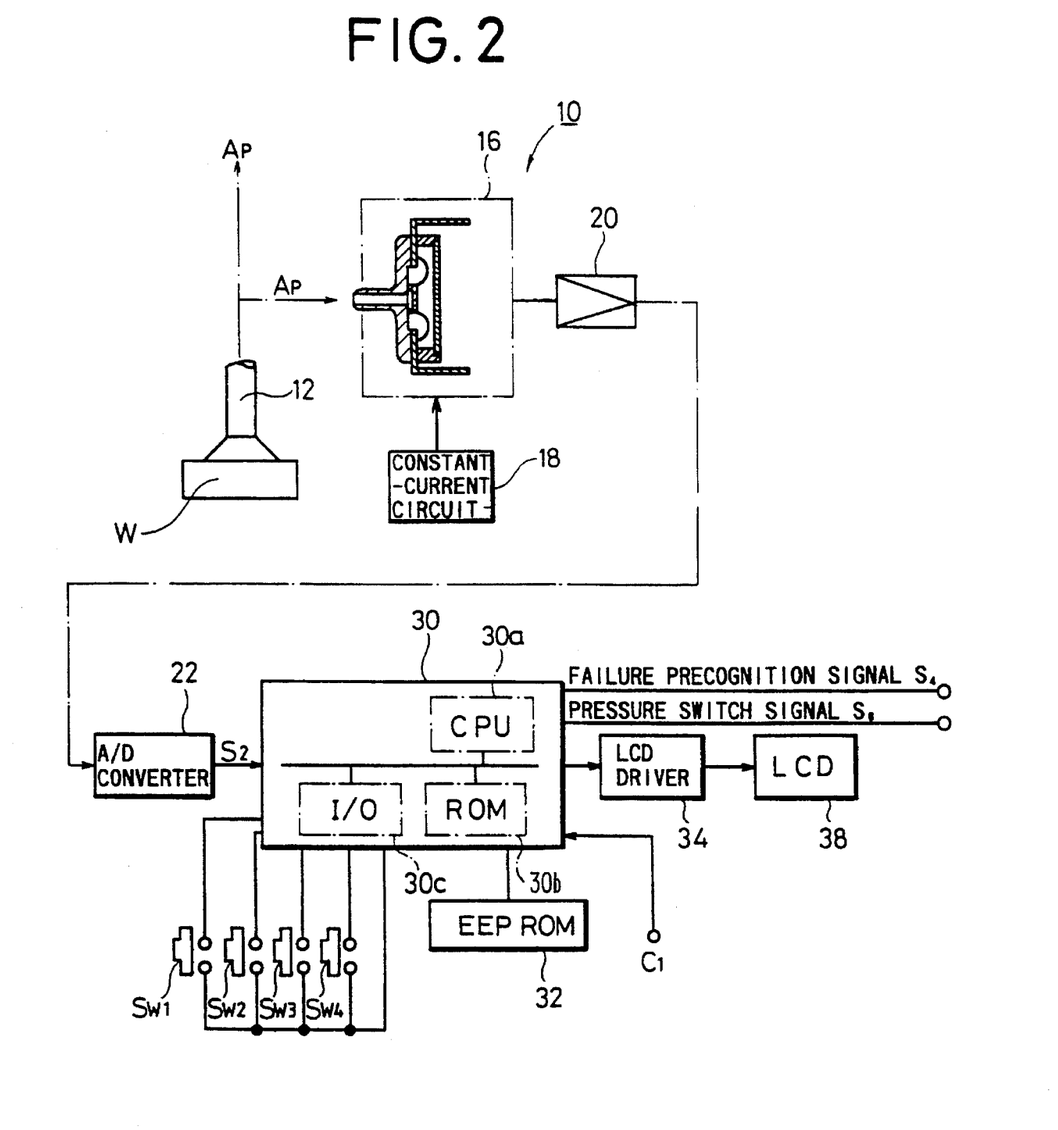
FIG. 2 is a view illustrating the overall structure of a vacuum pressure information processing apparatus according to one embodiment of the present invention, which is incorporated in a vacuum control apparatus.

FIG. 2 shows the overall structure of a vacuum pressure information processing apparatus 10 according to one embodiment of the present invention, which is incorporated in a vacuum control apparatus. In FIG. 2, reference numeral W indicates a work, and reference numeral 12 indicates a suction cup or pad for the attraction of the work, which is mounted on a delivering means employed in a vacuum system.

The vacuum pressure information processing apparatus 10 comprises a semiconductor pressure sensor 16 for detecting the value (vacuum) of pressurized air Ap so as to output a detected signal therefrom, a constant-current circuit 18, and an amplifier 20. In addition, the vacuum pressure information processing apparatus 10 also includes an A/D converter 22 for converting a signal output from the amplifier 20, i.e., an analog signal corresponding to the value (vacuum) of the pressurized air Ap into a digital detection signal $S_2$, and a controller 30 such as a one-chip microcomputer. The controller 30 is provided with a CPU 30a, a ROM 30b with programs stored therein, and an I/O 30c or the like, and includes set-value up/down switches $S_{W1}/S_{W2}$, a set switch $S_{W3}$, and a reset switch $S_{W4}$ all of which are electrically connected thereto and will be described later. Also connected to the controller 30 are an EE($E^2$)PROM 32 capable of storing information therein and capable of retaining the information therein when a power source is turned off, and an LCD driver 34 and an LCD 38 which are used to visually display set values and information to be describe later in the form of numbers, alphabetic letters and Chinese characters, for example.

The vacuum control apparatus incorporating the vacuum pressure information processing apparatus therein constructed as described above will be illustrated in each of FIGS. 3 through 5.

Figure 3:
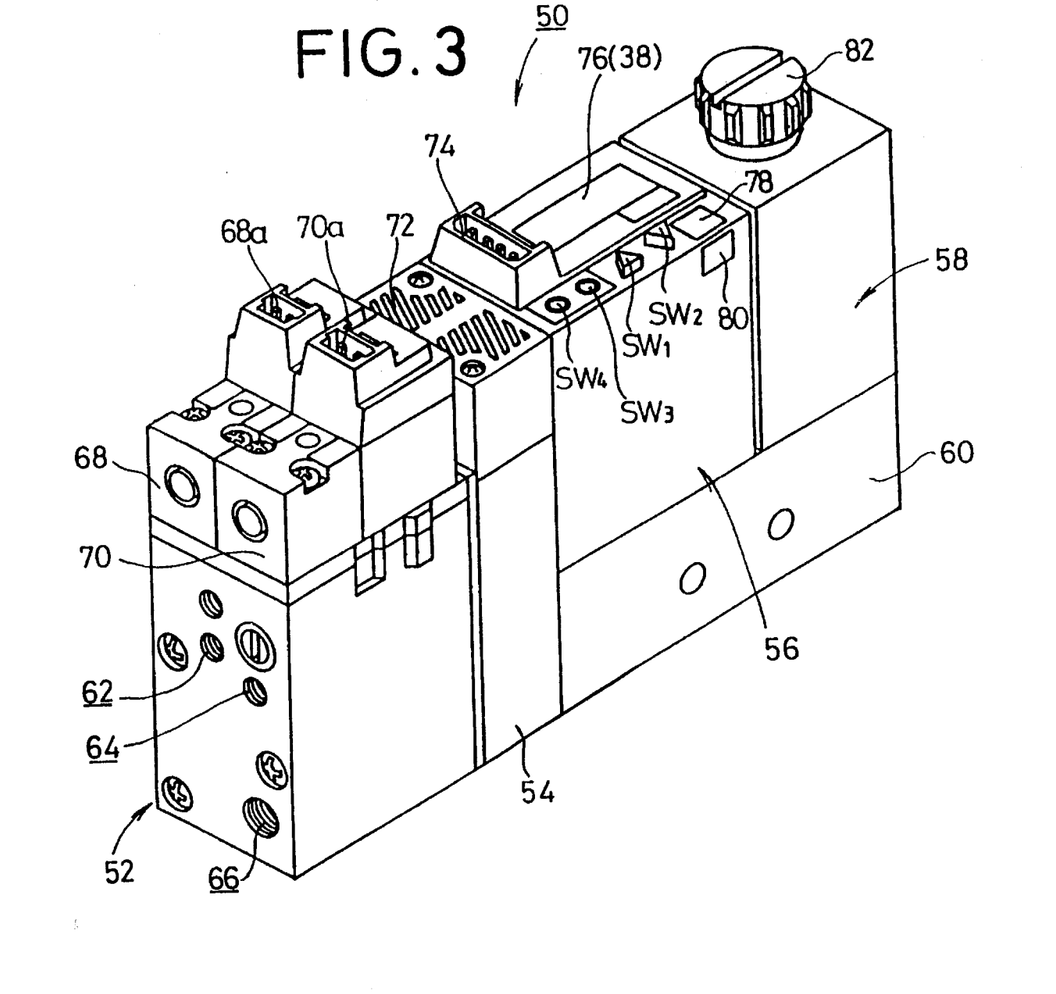
FIG. 3 is a perspective view showing the vacuum control apparatus.
Figure 4:
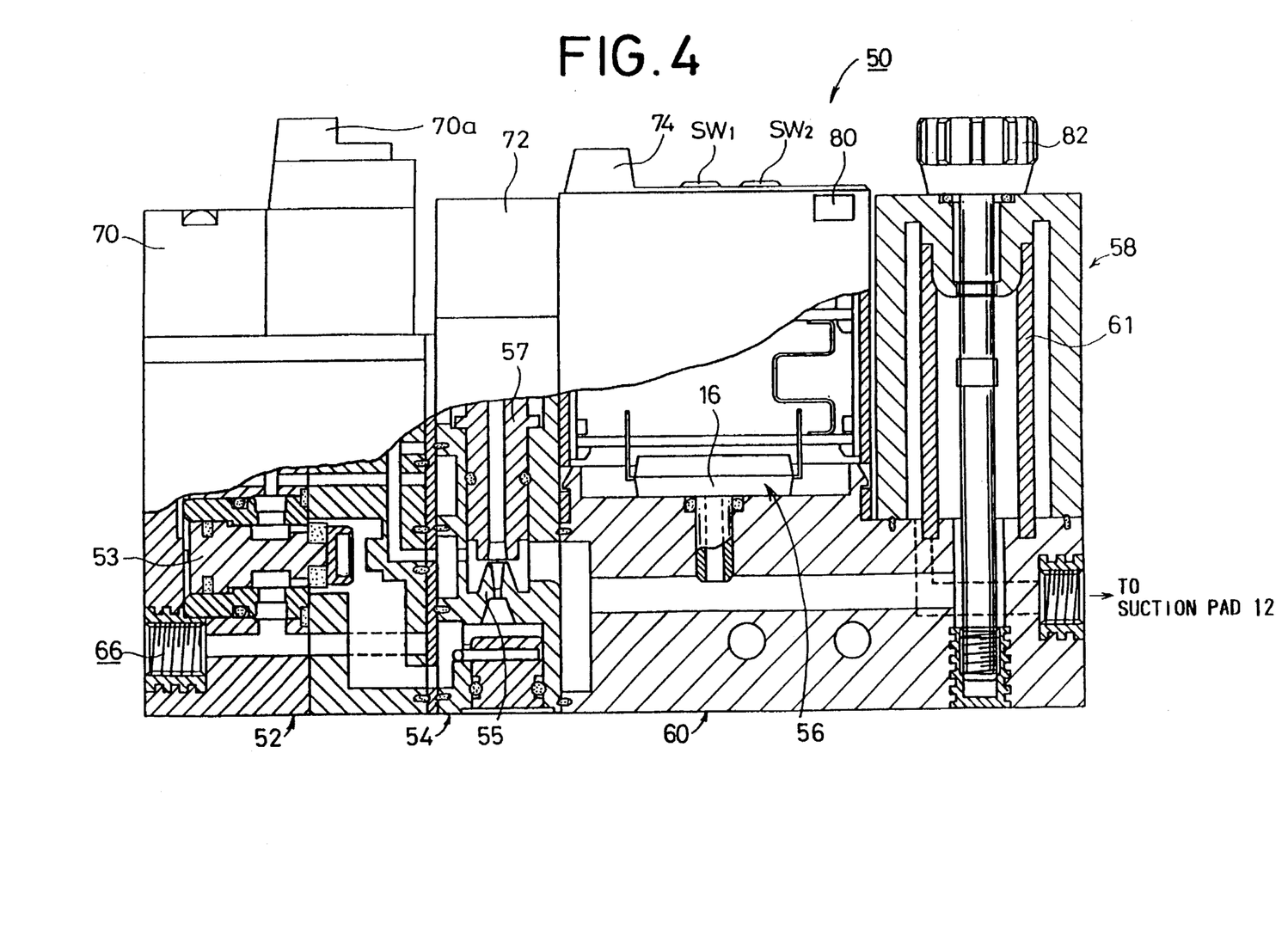
FIG. 4 is a vertical cross-sectional view, partly in cross section, showing the structure of the vacuum control apparatus in which an ejector is incorporated.

Referring to FIGS. 3 and 4, reference numeral 50 indicates a vacuum control apparatus. The vacuum control apparatus 50 basically comprises a valve block 52, an ejector 54, a detecting unit 56, a filter 58 and a connecting member 60. The valve block 52 has air feed ports 62, 64, 66 defined therein, a poppet valve 53 disposed therein for feeding pressurized air to the ejector 54 and blocking the same, and first and second electromagnetic valves 68, 70 mounted on the upper surface thereof. The first electromagnetic valve 68 is used as a pressurized-air feed valve, whereas the second electromagnetic valve 70 is uses as an electromagnetic valve for the vacuum break. In order to supply electric power and a control signal such as an ON/OFF signal to the outside via unillustrated conductors, the first and second electromagnetic valves 68 and 70 are provided with first and second connectors 68a, 70a respectively. The ejector 54 is provided adjacent to the valve block 52. In addition, the ejector 54 has a nozzle 55 and a diffuser 57 both disposed therein, and a silencer 72 mounted on the upper surface thereof. The silencer 72 serves to silence sound produced by pressurized air fed from the diffuser 57. The detecting unit 56 detects pressure under vacuum and includes the semiconductor pressure sensor 16 disposed therein. The detecting unit 56 also includes on the upper surface thereof a connector 74, a digital display unit 76, the set-value up switch $S_{W1}$, the set-value down switch $S_{W2}$, the set switch $S_{W3}$, the reset switch $S_{W4}$, and display units 78, 80. The digital display unit 76 can carry out visual representation of "failure", for example in either English or other language. The filter 58 has a main body 61 thereof disposed therein, which includes a hydrophobic material and serves to prevent water from entering therein. In addition, the filter 58 is detachably mounted on the connecting member 60 by a control 82. The valve block 52, the ejector 54, the silencer 72, the detecting unit 56 and the filter 58 are respectively in a communication state wherein pressurized fluids can flow through internal passages. In particular, there are disposed within the detecting unit 56, the semiconductor pressure sensor 16 (e.g., differential pressure type or capacity type) composed of a piezo or the like, the constant-current circuit 18, the amplifier 20, the A/D converter 22, the controller 30, the EE($E^2$)PROM 32, the LCD driver 34, etc. (see FIG. 2). The connector 74 can be electrically-connected with conductors to produce a failure precognition signal $S_4$ and a pressure switch signal $S_6$ shown in FIG. 2. The connector 74 can also be connected with a power source corresponding to the detecting unit 56, and a control signal conductor. In addition, the connector 74 can provide a communication function for other vacuum control apparatus, an external control apparatus, etc. to produce pressure detection information or control information therefrom.

Incidentally, the first connector 68a, the second connector 70a, and the connector 74 may be combined to form a single unit of valves and switches, thereby simplifying a control system.

Figure 6:
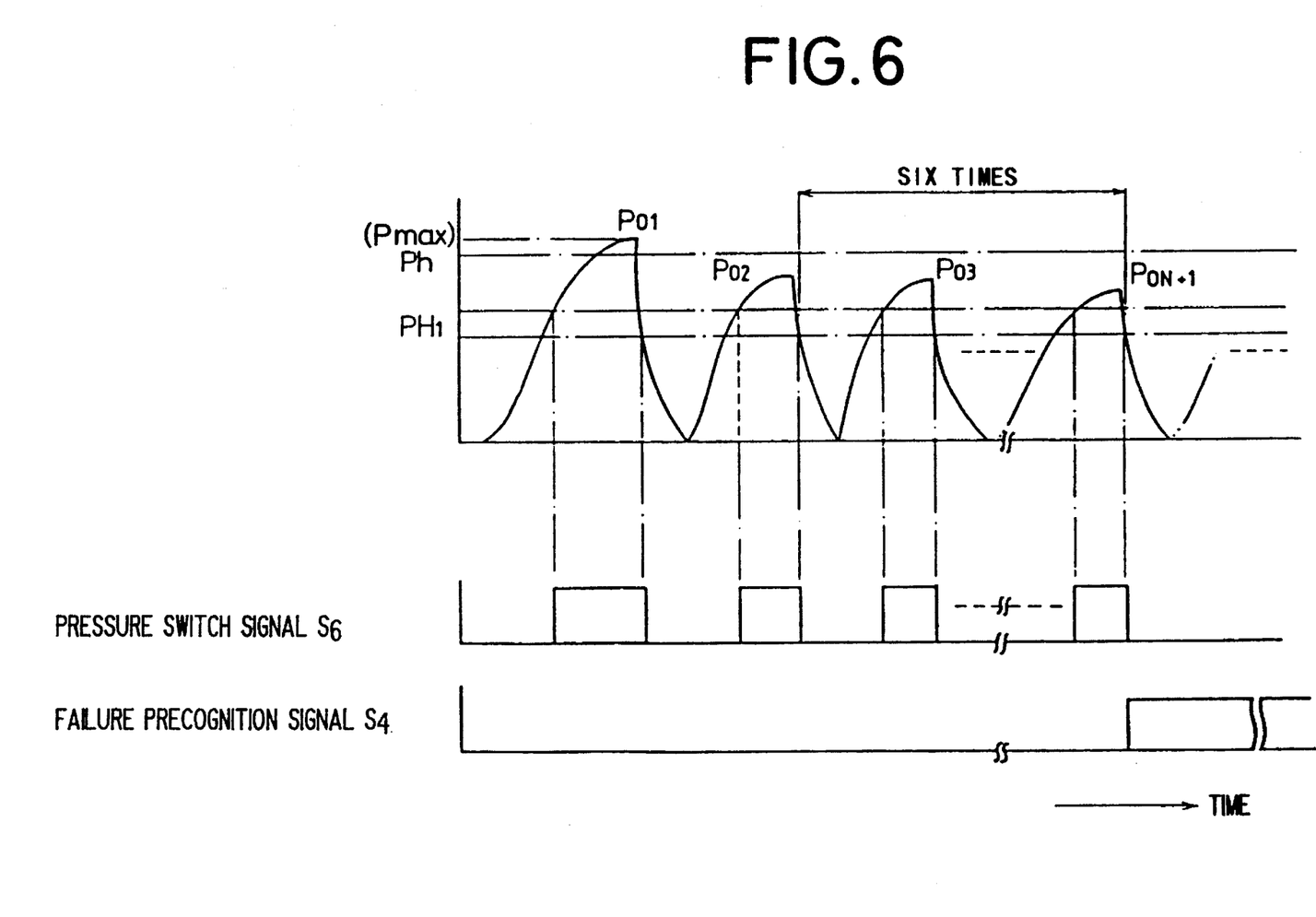
FIG. 6 is a view for describing the manner in which each of pressure switches employed in the vacuum control apparatus shown in each of FIGS. 2 through 5 is actuated.

In the vacuum control apparatus constructed as described above, when an operation start instruction signal $C_1$ is first input, pressurized air is introduced from the air feed port 66 so as to produce a vacuum in the ejector 54. At this case, the air feed ports 62, 64 have been sealed with blank caps respectively. The so-produced vacuum brings the suction cup 12 coupled to an unillustrated port of the connecting member 60 to the negative pressure, i.e., vacuum. Thus, the suction cup 12 attracts and holds the work W in accordance with the operation of a conveying means such as a robot. Then, the suction cup 12 is inactivated to release the work W. As a result, the pressure (vacuum) successively applied to the semiconductor sensor 16 in the detecting unit 56 is represented in the form of pressure values sequentially varied as illustrated in FIG. 6, i.e., $P_{01}, P_{02}, P_{03}, \ldots, P_{ON+1}$. As is understood from the drawing at this time, there is often a case in which the maximum degree of vacuum, identified as Pmax in FIG. 6, is reduced with the elapse of time owing to leakage of the vacuum pressure from the suction cup 12 side and clogging of the filter 58, for example.

A signal corresponding to each of the pressure values $P_{01}, P_{02}, P_{03}, \ldots, P_{ON+1}$ is supplied via the semiconductor pressure sensor 16 and the amplifier 20 to the A/D converter 22 where it is converted into a digital detection signal $S_2$, which is, in turn, input to the controller 30.

For initial setup, the operator may adjust switches SW1 through SW4 in conjunction with controller 30 having programs for performing the following. First, peak values of the pressure values P01, P02, P03, ... PON+1, are specified and stored in EE($E^2$)PROM 32. Such values are successively displayed on the LCD 38 of the digital display unit 76 with the previous respective values. Then, the threshold value for producing a pressure switch signal S6 relative to the pressure values P01, P02, P03, ... PON+1, (i.e., differential pressure PH1) is set by switches SW1 through SW4. Then, the value Ph is set as the failure prediction/recognition/precognition value which can be, for example, 20% of the normal maximum vacuum, and stored in EE($E^2$)PROM 32. Differential pressure PH1 may be set up, and stored in EE($E^2$)PROM 32, as the maximum value (Pmax) of P01 reduced by a predetermined percentage such as, for example, several to several tens of percents.

Further, unwanted or improper vacuum pressure values below the failure precognition determining vacuum Ph among the pressure values $P_{01}, P_{02}, P_{03}, \ldots, P_{ON+1}$ are counted six times, for example. Such set values or the like are visually displayed on the LCD 38.

After the above pressure setting-up process has been completed, a pressure switch signal $S_6$ corresponding to the differential pressure $PH_1$ with respect to each of the pressure values $P_{01}, P_{02}, P_{03}, \ldots, P_{ON+1}$ or information about the differential pressure $P_{H1}$ is successively produced in such a manner as to be used for control of each of various control driving means such as a delivering means and for information processing in an FMS, a CIM, etc.

On the other hand, when unwanted or improper vacuum-value data Pd (corresponding to the digital detection signal $S_2$) below the Ph among the pressure values $P_{01}, P_{02}, P_{03}, \ldots, P_{ON+1}$ is successively produced six times (that is, when the count of the improper vacuum-value data is six times), a failure precognition signal $S_4$ is continuously produced (see FIG. 6).

At this time, information about the failure precognition signal $S_4$ thus produced is stored in the EE($E^2$)PROM 32, and the information can be read again from the EE($E^2$)PROM 32 when the controller 30 is activated again after the power source has been turned off.

The sequential control of the controller 30 for producing the failure precognition signal $S_4$ based on the program stored in the ROM 30b will now be described below.

The present program is executed in such a manner that the controller 30 starts its operation on the basis of the input of the operation start instruction signal $C_1$ for the entire apparatus to the controller 30.

Figure 7:
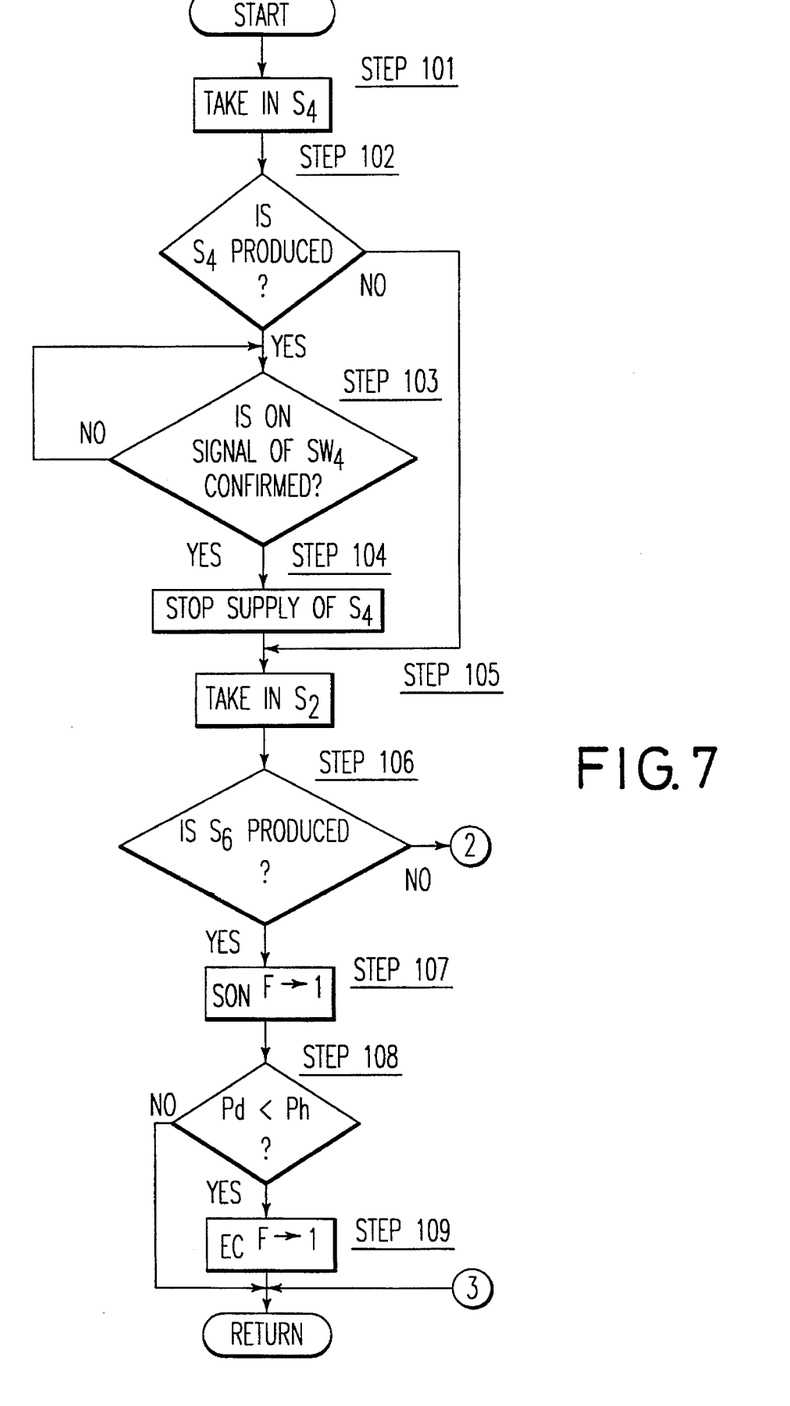
FIG. 7 is a flowchart for describing a program executed by a controller employed in the vacuum control apparatus shown in each of FIGS. 2 through 5.
Figure 8:
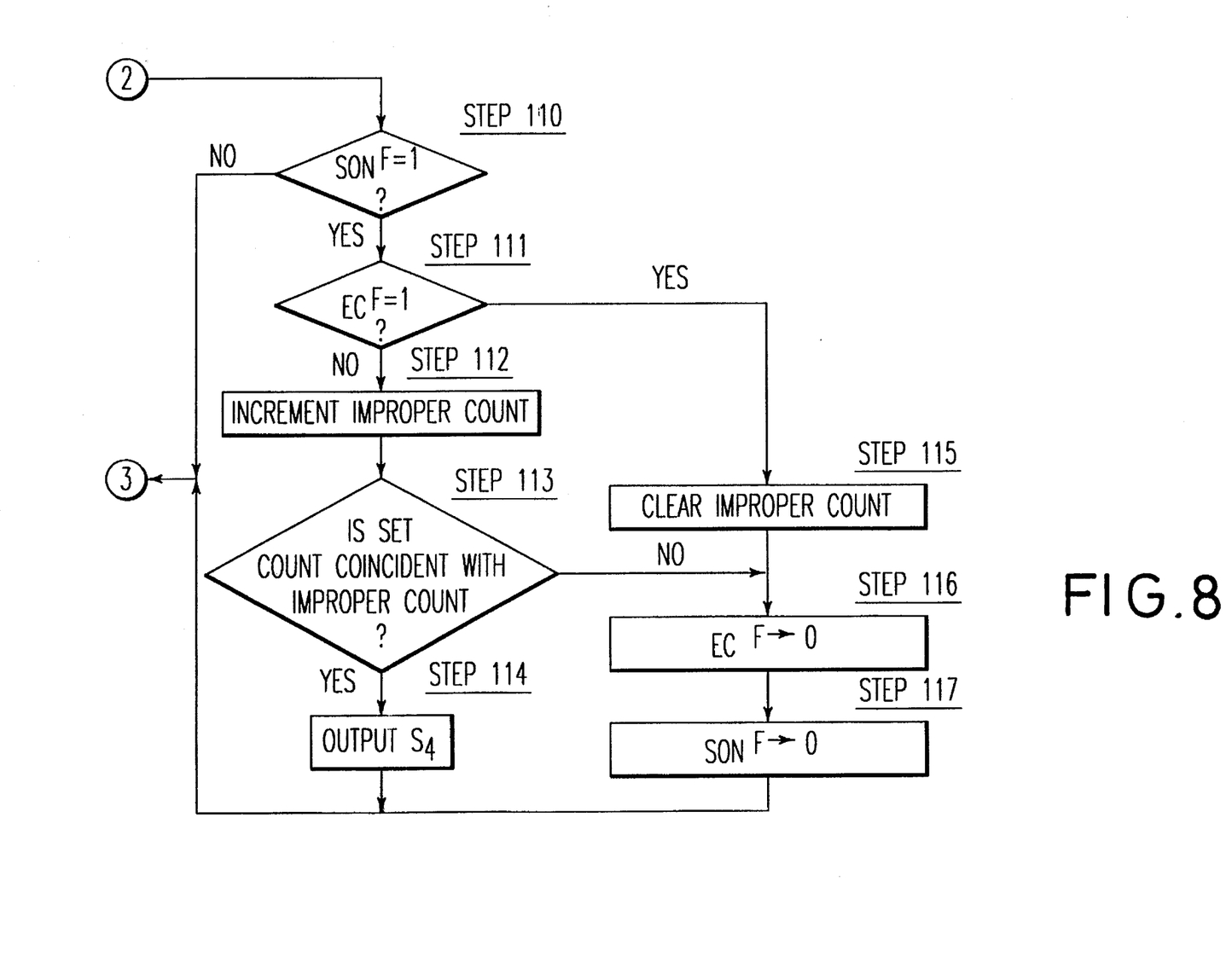
FIG. 8 is a flowchart for describing another program executed by the controller employed in the vacuum control apparatus shown in each of FIGS. 2 through 5.

1) A process for taking in a failure precognition signal $S_4$, i.e., bringing the same from the controller 30 is executed in Step 101 (see FIGS. 7 and 8).

2) A process for determining whether or not the failure precognition signal $S_4$ has been produced is executed in Step 102. If the answer is determined to be YES, then the routine procedure proceeds to Step 103. If the answer is determined to be NO, then the routine procedure proceeds to Step 105.

3) A process for determining whether or not an ON signal has been produced when the reset switch $S_{W4}$ is turned on is executed in Step 103. If the answer is determined to be NO, then the routine procedure is returned to Step 103. If the answer is determined to be YES, then the routine procedure proceeds to the next Step 104.

4) A process for stopping the delivery of the failure precognition signal $S_4$ from the controller 30 (continuously produced until now in steps 101 through 103) is executed in Step 104.

5) A process for allowing the controller 30 to take in a digital detection signal $S_2$ is executed in step 105.

6) A process for determining whether or not a pressure switch signal $S_6$ has been produced is executed in Step 106. If the answer is determined to be YES, then the routine procedure proceeds to the next Step 107. If the answer is determined to be NO, then the routine procedure proceeds to Step 110.

7) A process for bringing a flag $_{SON}F$ to 1 when the pressure switch signal $S_6$ is in an ON state, is executed in Step 107. If the pressure switch signal $S_6$ is in an OFF state, then the flag $_{SON}F$ is brought to 0, and hence the flag $_{SON}F$ is down (reset).

8) A process for determining whether or not vacuum-value data Pd (the maximum value of the digital detection signal $S_2$) is less than the failure precognition determining vacuum Ph (i.e., Pd<Ph) is executed in Step 108. If the answer is determined to be NO, then it is determined that the vacuum-value data Pd is normal, and hence the routine procedure proceeds to "Return". If the answer is determined to be YES, then the routine procedure proceeds to the next Step 109.

9) A process for bringing a flag $_{EC}F$ to 1 when the vacuum-value data Pd does not exceed the failure precognition determining vacuum Ph at the time that the pressure switch signal $S_6$ is in the ON state, is executed in Step 109. Thereafter, the routine procedure proceeds to "Return".

10) If the answer is determined to be NO in Step 106, then a process for determining whether or not the flag $_{SON}F$ has been brought to 1 is executed in Step 110. If the answer is determined to be NO, then the routine procedure proceeds to "Return". If the answer is determined to be YES, then the routine procedure proceeds to the next Step 111.

11) A process for determining whether or not the flag $_{EC}F$ has been brought to 1 is executed in Step 111. If the answer is determined to be YES, then the routine procedure proceeds to Step 115. If the answer is determined to be NO, then the routine procedure proceeds to the next Step 112.

12) A process for performing an increment in the unwanted or improper count is executed in Step 112.

13) A process for determining if the improper count has reached the set count (for example, six times), is executed in Step 113. If the answer is determined to be YES, then the routine procedure proceeds to the next Step 114. If the answer is determined to be NO, then the routine procedure proceeds to Step 116.

14) A process for delivering a failure precognition signal $S_4$ from the controller, is executed in Step 114. Thereafter, the routine procedure proceeds to "Return" to start the next determining process.

15) If the answer is determined to be YES in Step 108, i.e., if the vacuum-value data Pd was less than the failure precognition determining vacuum Ph in the ON state of the pressure switch signal $S_6$, then a process for bringing its undesired result to a normal state so as to clear the unwanted or improper count is executed in Step 115.

16) A process for bringing the flag $_{EC}F$ to 0 is executed in Step 116, followed by proceeding to the next Step 117.

17) A process for bringing the flag $_{SON}F$ to 0 is executed in Step 117. Thereafter, the routine procedure proceeds to "Return" to start the next determining process again.

Thus, when the unwanted or improper count with respect to the failure precognition determining vacuum Ph coincides with the preset number of times at the time that the maximum pressure value is lowered with the elapse of time by repeatedly performing a process for delivering a work W, for example, a failure precognition signal $S_4$ is produced so as to provide effective information about the time when devices such as the filter, the ejector, etc. should be replaced by new ones due to the clogging of the filter 58, the deterioration in performance of the ejector, etc. In addition to the supply of such effective information, the pressure values such as the failure precognition determining vacuum Ph, the differential pressure $PH_1$, etc. can accurately and easily be set up, and distinctly displayed together with the present pressure value.

In the present embodiment, the number of times n (unwanted or improper count) in which the vacuum-value data does not reach the failure precognition determining vacuum Ph and the preset number of times N (set count) are six times in succession. In addition, a failure precognition signal $S_4$ is produced, that is, a failure precognition signal $S_4$ indicative of a pressure value disabling a normal work delivering process or the like is produced to provide information about a prejudgment.

A criterion for such a previous judgment can be changed depending on the construction and the operational state of the delivering means. Examples include the case when the vacuum-value data Pd produced one time does not reach the failure precognition determining vacuum Ph; a case in which the rate at which the vacuum-value data Pd does not reach the failure precognition determining vacuum Ph within a predetermined number of times, exceeds a predetermined value; and a case in which the rate at which the vacuum-value data Pd does not reach the failure precognition determining vacuum Ph during a predetermined period of time, exceeds a given value. In this case, a program based on the above criterion may be executed to produce a failure precognition signal $S_4$ in a manner similar to the aforementioned embodiment.

Figure 5:
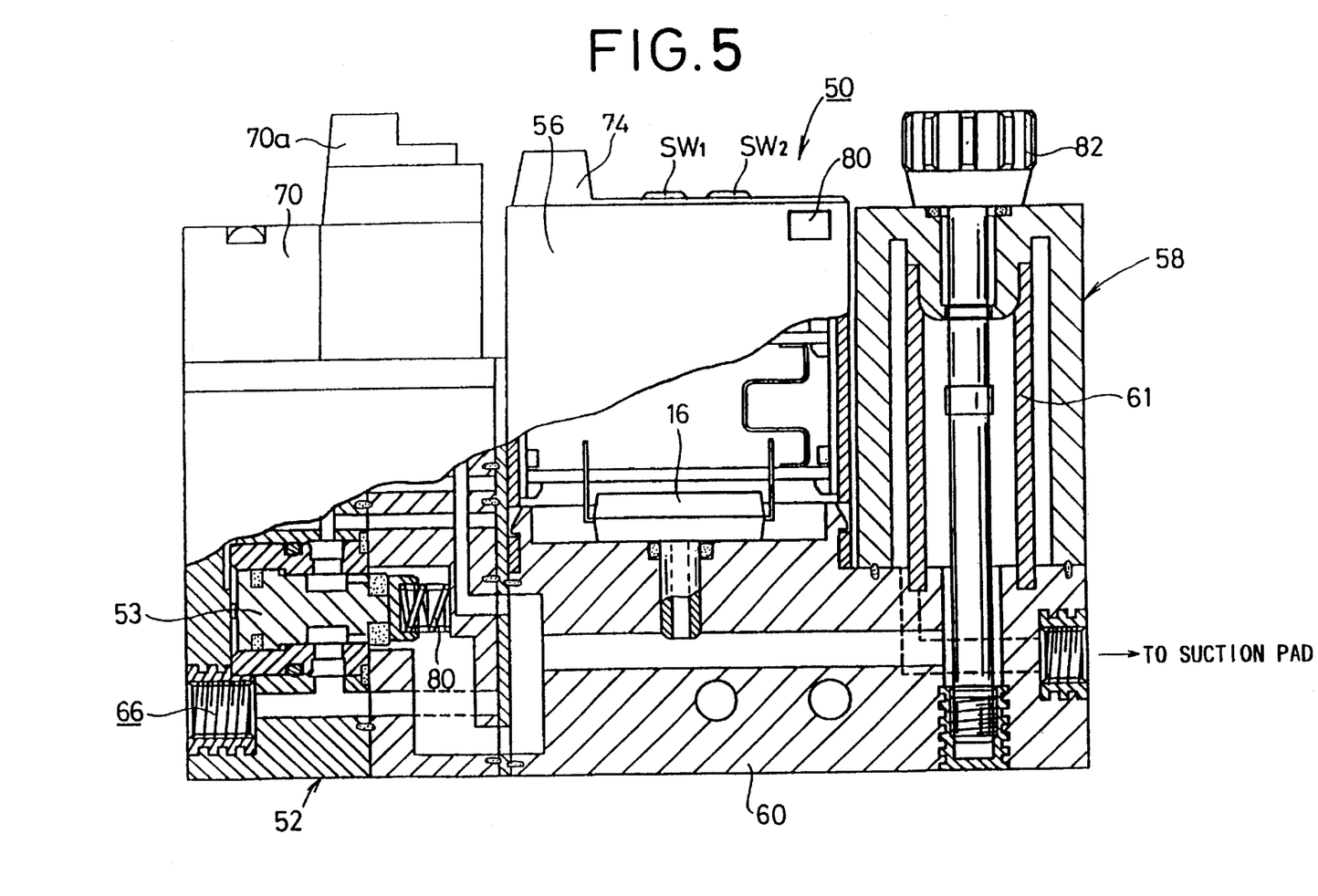
FIG. 5 is a vertical cross-sectional view, partly in cross section, illustrating the structure of the vacuum control apparatus to which a vacuum pump is coupled.

FIG. 5 shows another embodiment of the vacuum control apparatus 50 shown in FIG. 4. This embodiment is constructed such that a vacuum pump (not shown) as an alternative to an ejector 54 is coupled to a port 66. Therefore, a poppet valve 53 has the same shape as that of the poppet valve shown in FIG. 4. However, the poppet valve 53 is reset by a coil spring 80. The remaining construction of the present embodiment is identical to that of the vacuum control apparatus 50 shown in FIG. 4, and its detailed description will therefore be omitted. Incidentally, operations and effects of the vacuum control apparatus 50 shown in FIG. 5 are substantially identical to those of the vacuum control apparatus shown in FIG. 4. The vacuum control apparatuses shown in FIGS. 4 and 5 can also be plurally provided in continuation with one another and manifolded. The vacuum control apparatus may be set up so as to have the arrangement shown in FIG. 5, which is disclosed in Japanese Patent Application Laid-Open No. 63-154900, for example. Further, valves and sensor control devices (reference numerals 68a, 70a, 74 in the present embodiment) may integrally be formed to carry out processes such as control for an electromagnetic valve, confirmation for the attraction of a work, precognition of a failure and ON/OFF control of a valve. In the above-described embodiment, the threshold value is set up in digital form with respect to the maximum value of the pressure values which vary with the time. On the other hand, in another embodiment, information about curves indicative of changes in pressure is stored and various threshold values can also be set up.

According to a vacuum pressure information processing method of the present invention, as has been described above, each of pressure values detected from a pressure detecting element is represented in digital form. A pressure value employed for a given purpose can easily be set up in digital form by a switch means. Further, according to the vacuum pressure information processing apparatus of the present invention, when the maximum pressure value coincides with a preset pressure value at the time that the maximum pressure value is reduced with the elapse of time by repeatedly performing a work delivering process or the like and the so-reduced pressure value cannot reach the preset pressure value (a failure precognition determining pressure value), a failure precognition signal is produced so as to provide information about an effective pre-judgment such as failure precognition. In addition to the supply of such information, pressure values such as a failure precognition determining pressure value, differential pressure, etc. can accurately and easily be set up by a set switch and a reset switch. Furthermore, the pressure values such as the failure precognition determining pressure value, the differential pressure can reliably be displayed on a digital display unit together with the present pressure value.

Having now fully described the invention, it will be apparent to those skilled in the art that many changes and modifications can be made without departing from the spirit or scope of the invention as set forth herein.

What is claimed is:

1. A method of processing vacuum pressure information in a vacuum unit, comprising the steps of:

setting a warning vacuum level;

feeding pressurized air from a poppet valve in the vacuum unit through an ejector and to a sensor;

detecting vacuum levels in the vacuum unit by means of said sensor;

comparing said vacuum levels detected in said detecting step against said warning vacuum level set in the setting step; and producing an alarm signal when said comparing step indicates that said vacuum levels detected in said detecting step do not reach said warning vacuum level a predetermined number of successive times.

2. A method as recited in claim 1, further comprising the steps of:

setting a differential pressure range; and producing a control signal while said vacuum levels detected in said detecting steps fall within said differential pressure range.

3. A method as recited in claim 2, wherein said step of setting said differential pressure range is performed by setting said differential pressure range as the maximum of said vacuum levels detected in said detecting step reduced by a predetermined percentage.

4. A method of processing vacuum pressure information in a vacuum unit, comprising the steps of:

setting a warning vacuum level;

feeding pressurized air from a poppet valve in the vacuum unit through an ejector and to a sensor;

detecting vacuum levels in the vacuum unit by means of said sensor;

comparing said vacuum levels detected in said detecting step against said warning vacuum level set in the setting step; and producing an alarm signal when said comparing step indicates that said vacuum levels detected in said detecting step do not reach said warning vacuum level a certain percentage of times for a predetermined number of comparisons.

5. A method as recited in claim 4, further comprising the steps of:

setting a differential pressure range; and producing a control signal while said vacuum levels detected in said detecting step fall within said differential pressure range.

6. A method as recited in claim 5, wherein said step of setting said differential pressure range is performed by setting said differential pressure range as the maximum of said vacuum levels detected in said detecting step reduced by a predetermined percentage.

7. A method of processing vacuum pressure information in a vacuum unit, comprising the steps of:

setting a warning vacuum level;

feeding pressurized air from a poppet valve in the vacuum unit through an elector and to a sensor;

detecting vacuum levels in the vacuum unit by means of said sensor;

comparing said vacuum levels detected in said detecting step against said warning vacuum level set in the setting step; and producing an alarm signal when said comparing step indicates that said vacuum levels detected in said detecting step do not reach said warning vacuum level set in the setting step a certain percentage of times for a predetermined period of time.

8. A method as recited in claim 7, further comprising the steps of:

setting a differential pressure range; and producing a control signal while said detected vacuum levels detected in said detecting step fall within said differential pressure range.

9. A method as recited in claim 8, wherein said step of setting said differential pressure range is performed by setting said differential pressure range as the maximum of said vacuum levels detected in said detecting step by a predetermined percentage.

* * * * *

UNITED STATES PATENT AND TRADEMARK OFFICE
CERTIFICATE OF CORRECTION

PATENT NO. : 5,475,619
DATED : December 12, 1995
INVENTOR(S) : Shigeru SUGANO, et al.

It is certified that error appears in the above-indentified patent and that said Letters Patent is hereby corrected as shown below:

On the title page, Item [63], the Related U.S. Application Data, should read:

--Continuation of Ser. No. 254,659, Jun. 3, 1994, abandoned, which is a continuation of Ser. No. 838,948, Feb. 21, 1992, abandoned.--

Signed and Sealed this

Ninth Day of April, 1996

Attest:

BRUCE LEHMAN

Attesting Officer

Commissioner of Patents and Trademarks